(12) United States Patent
Guasina et al.

(10) Patent No.: US 11,602,159 B2
(45) Date of Patent: Mar. 14, 2023

(54) EXTRUSION PROCESS AND ASSOCIATED DEVICE

(71) Applicant: Barilla G. e R. Fratelli S.p.A., Parma (IT)

(72) Inventors: Luca Guasina, Lesignano Bagni (IT); Antonio Gagliardi, Bologna (IT)

(73) Assignee: BARILLA G. E R. FRATELLI S.P.A., Parma (IT)

( * ) Notice: Subject to any disclaimer, the term of this patent is extended or adjusted under 35 U.S.C. 154(b) by 697 days.

(21) Appl. No.: 16/269,785

(22) Filed: Feb. 7, 2019

(65) Prior Publication Data

US 2019/0246684 A1  Aug. 15, 2019

(30) Foreign Application Priority Data

Feb. 13, 2018  (IT) .......................... 102018000002656

(51) Int. Cl.
| | |
|---|---|
| *A23P 30/20* | (2016.01) |
| *B33Y 30/00* | (2015.01) |
| *A21C 11/18* | (2006.01) |
| *A23P 20/20* | (2016.01) |
| *A23P 20/25* | (2016.01) |

(Continued)

(52) U.S. Cl.
CPC .............. *A23P 30/20* (2016.08); *A21C 11/18* (2013.01); *A23P 20/20* (2016.08); *B33Y 30/00* (2014.12); *A23P 2020/253* (2016.08); *A47J 27/002* (2013.01); *B33Y 80/00* (2014.12)

(58) Field of Classification Search
CPC ...... Y02A 40/81; Y02A 40/83; Y02A 40/834; A21C 11/18; A21C 3/04; A23P 2020/253; A23P 20/20; A23P 30/20; A47J 27/002; B33Y 30/00; B33Y 70/00; B33Y 80/00; A23L 7/109–7/113
See application file for complete search history.

(56) References Cited

U.S. PATENT DOCUMENTS 1,566,705 A * 12/1925 Tanzi ..................... A21C 11/00
426/500
1,724,545 A *  8/1929 Ambrette ............... A21C 11/00
425/190

(Continued)

FOREIGN PATENT DOCUMENTS

| WO | 2009/093193 A2 |  7/2009 |
|---|---|---|
| WO | 2010/151202 A1 | 12/2010 |
| WO | 2014/190168 A1 | 11/2014 |

OTHER PUBLICATIONS

International Search Report for Italian Application No. IT 201800002656 (4 Pages) (dated Oct. 9, 2018).

*Primary Examiner* — Drew E Becker
(74) *Attorney, Agent, or Firm* — Lucas & Mercanti, LLP

(57) ABSTRACT

Process for the production of a three-dimensional item by extrusion of a string of dough, comprising a step of providing a viscoelastic food dough inside an extruder comprising a cylindrical tubular body and a piston, an extrusion step by advancing the piston inside the cylindrical tubular body, and a step of interrupting extrusion of the dough by stopping the advancing movement of said piston; a dispensing device comprising such a cylindrical tubular body and such a piston, as well as a printer for the production of an item printed by means of a 3D printing procedure comprising such an extruder, are also described.

10 Claims, 5 Drawing Sheets

(51) Int. Cl.
   *B33Y 80/00*   (2015.01)
   *A47J 27/00*   (2006.01)

(56) References Cited

U.S. PATENT DOCUMENTS

| | | | | |
|---|---|---|---|---|
| 2,101,075 | A * | 12/1937 | Kielsen | A23G 3/28 222/386 |
| 2,634,692 | A * | 4/1953 | Sherbondy | A23G 3/28 222/391 |
| 3,459,141 | A * | 8/1969 | O'Dell | A21C 11/10 366/279 |
| 3,937,608 | A * | 2/1976 | Farrant | A21C 11/18 425/159 |
| 4,114,781 | A * | 9/1978 | Doyel | A21C 11/18 222/326 |
| 4,360,332 | A * | 11/1982 | Cyin | A21C 11/16 425/464 |
| 4,456,450 | A * | 6/1984 | Heling | A21C 11/18 604/209 |
| 5,156,305 | A * | 10/1992 | Eyre | B05C 17/01 222/391 |
| 5,198,239 | A * | 3/1993 | Beavers | A21C 11/163 426/516 |
| 5,375,740 | A * | 12/1994 | Umetsu | B05C 17/00583 222/391 |
| 5,480,673 | A * | 1/1996 | Rokey | A23K 40/20 426/2 |
| 5,558,892 | A * | 9/1996 | Pelka | A21C 11/18 222/386 |
| 6,026,985 | A * | 2/2000 | Elliott, Sr. | A21C 11/18 222/326 |
| 6,319,532 | B1 * | 11/2001 | Pineault | A23G 9/283 222/386 |
| 7,017,783 | B1 * | 3/2006 | Hunter | A23G 9/28 222/327 |
| 7,820,215 | B2 * | 10/2010 | Bortone | B29C 48/29 426/519 |
| 8,747,007 | B2 * | 6/2014 | Krcma | A21C 15/005 401/160 |
| 8,986,767 | B2 * | 3/2015 | Batchelder | A23G 1/0056 426/520 |
| 10,154,676 | B1 * | 12/2018 | Ready | B05C 17/00523 |
| 2004/0187706 | A1 * | 9/2004 | Glucksman | A21C 11/18 99/450.1 |
| 2007/0251957 | A1 * | 11/2007 | Chen | G01F 13/00 222/386 |
| 2011/0027401 | A1 * | 2/2011 | Schnee | A23G 3/28 425/87 |
| 2012/0251689 | A1 * | 10/2012 | Batchelder | A23G 3/0242 99/450.1 |
| 2017/0035082 | A1 * | 2/2017 | Tutuncu | A23L 7/109 |
| 2017/0259482 | A1 * | 9/2017 | Contractor | B33Y 30/00 |
| 2018/0007949 | A1 | 1/2018 | Sung et al. | |

* cited by examiner

EXTRUSION PROCESS AND ASSOCIATED DEVICE

CROSS-REFERENCE TO RELATED APPLICATIONS

This application claims the benefit of Italian Patent Application No. 10201800002656 filed Feb. 13, 2018, the contents of which are incorporated herein by reference.

FIELD OF APPLICATION

The present invention relates mainly, although not exclusively, to the sector of the food industry.

In particular, the invention relates to a process for dispensing and extruding a string of dough obtained from a viscoelastic food dough, preferably a dough based on food meal, for example a dough suitable for the production of pasta.

The invention also relates to a system comprising a cylindrical tubular body and a piston, wherein this system is designed to implement the aforementioned process for dispensing and extruding a string of dough. The invention also relates to a 3D printer comprising such a system.

PRIOR ART

The preparation of food products shaped with particular or complex forms by means of three-dimensional (3D) printing techniques has been known for several years. The patent application WO 2010/151202 is cited by way of example, this application describing an apparatus for printing food in two-dimensional or three-dimensional shapes, comprising a container for printable fluid food, a container for a binder, typically alginic acid, and a dispenser. The apparatus described also comprises a control unit able to control the movement of the dispenser (dispensing head). The application also describes a process for the production of a three-dimensional food comprising the step of producing drops of fluid food and binder and moving the dispenser after the deposition of each drop.

In order to perform three-dimensional printing, the relative movement (along the three axes X, Y and Z) of the extruder and the surface on which the extruded string is deposited must be carefully controlled, such that the desired three-dimensional item can be printed from a three-dimensional digital model, suitably converted into a program for movement of the axes. Depending on the circumstances, it can be useful to keep the extruder fixed and use the movement of the surface along the three axes X, Y and Z, or move the extruder along one, two or three axes, consequently limiting the movement of the deposition surface along the other axes.

The dispenser/extruder functions in many cases which are of interest in batch mode, causing the fluid contained inside a tubular body to be expelled through a nozzle of said tubular body, moving a piston along a further axis (called here "axis E"), namely the axis along which the piston slides inside the cylindrical tubular body. This movement of the axis E must be controlled and coordinated together with the relative movement of the extruder and surface along the aforementioned Cartesian axes (X, Y and Z).

In many real cases it is not possible to obtain a good 3D-printing result without taking into account, also during the programming of the movements X, Y, Z and E, the viscosity characteristics, or more generally consistency of the (fluid) food material contained inside the cylindrical tubular body and dispensed by the advancing movement of the piston.

An optimum control of the speed of expulsion of the extruded food material is in fact required, this being possible only by means of sophisticated control of the movement (position, speed and acceleration) of the piston.

In fact, normally, the (fluid) food material is loaded into a cylindrical tubular body inside which a piston comprising a rod, integral with a piston head, slides; the piston is moved along a linear axis and is operated by a motor, its movement being controlled by a control system. The movement (position, speed and acceleration) of the piston head along the linear axis inside the cylindrical tubular body and the characteristics of the nozzle determine the actual pressure of the food material (fluid) contained inside the cylindrical tubular body, which pressure also depends on the characteristics of the fluid itself. This pressure determines whether or not extrusion is performed, and influences the quality thereof, also depending on the characteristics of the nozzle.

Extrusion of the material contained inside the cylindrical tubular body is performed generally at a variable speed, with variations in the acceleration and possible stop and restarting operations, which are determined by the program for printing the three-dimensional item. In fact, in accordance with the printing program, in order to obtain complex three-dimensional forms, the speed of dispensing of the food material must also be regulated and if necessary dispensing stopped and started again. More particularly, the advancing movement of the piston inside the cylindrical tubular body must be managed in order to perform starting and restarting of the string of extruded food material.

The extruded food material can be a liquid material which is heated to a suitable temperature (for example in the case where chocolate gummy candies are produced) and immediately cooled once dispensed or can be in the form of a very viscous dough, such as a dough of food meal based material, used for example for the production of pasta. In this latter case, the dough usually takes the form of a paste-like fluid with a viscoelastic behaviour.

When a food material in the form of a viscoelastic fluid is extruded during the printing of a three-dimensional item, control of the dispensing of the continuous string of material and interruption thereof are particularly complicated. Commonly, when there are variations in the speed of advancing movement of the piston head, it is not possible to control precisely the variable speed of extrusion of the string and specifically stopping and starting of the extrusion operation.

In fact, when the advancing movement of the piston head is stopped, the viscoelastic food dough which is under pressure inside the cylindrical tubular body has an elastic energy which causes the string of food dough to continue to be expelled from the dispensing nozzle of the system for a certain period of time; therefore, stoppage of the piston head in a given position does not result in an immediate interruption of dispensing of the string of viscoelastic food material. This behaviour is entirely undesirable since it results in irregular metering of the string of material being dispensed for printing of a three-dimensional item, with the result that this type of article cannot be produced in a precise manner.

In other cases this drawback may be overcome by cutting and removing the excess product which emerges from the nozzle, but this is obviously not feasible for continuous and rapid stopping and restarting operations during 3D-printing, in particular for food products.

In an attempt to stop the dispensing of food material at the same time as stopping of the advancing movement of the piston head in a more precise manner, some three-dimensional printing processes envisage, immediately following stoppage, retraction of the piston head in a direction opposite to the direction of the dispensing nozzle. This measure is commonly employed during the extrusion of food creams, for example filling or dressing creams, ensuring a precise dosage for these specific applications. The adoption of a procedure for retracting the piston rod (and therefore the piston head connected to it) during extrusion of a string of viscoelastic food material for the printing of three-dimensional articles would be very problematic because it would require determining beforehand the exact retraction needed, in terms of distance and space, so as to be able to counteract precisely the expansion of the pressurised fluid following stoppage. This retraction would be dependent on the pressure of the fluid inside the cylinder (which is impossible to calculate) and, precisely because of the elasticity characteristics of the fluid, would be also dependent on the quantity of fluid present at that moment inside the cylinder. Incorrect or excessive retraction of the piston head would result in air (or even the already deposited string) being drawn into the cylinder, while insufficient retraction would not solve the problem of correctly stopping the flow of the extruded string.

The technical problem forming the basis of the present invention is therefore that of providing an extrusion process for the printing of three-dimensional food items which results in immediate interruption and, if necessary, subsequent restarting of extrusion of a string of material upon stoppage of the advancing movement of a piston inside the cylindrical tubular body inside in which the food material to be extruded is contained, said process being simple and precise for the desired application, while overcoming the problems encountered in connection with the prior art.

SUMMARY OF THE INVENTION

This technical problem is solved, according to the present invention, by a process for the production of a three-dimensional item by extrusion or deposition of a string of dough, comprising the following steps:
a) providing an extruder comprising a cylindrical tubular body having a first end closed by a bottom having at least one nozzle and a second end, and a piston comprising a rod and a piston head which can be removably coupled to one another;
b) feeding a viscoelastic food dough into said cylindrical tubular body;
c) providing said piston inside the side wall of said cylindrical tubular body, so that the aforementioned piston head is in contact with said side wall of the cylindrical tubular body and is freely slidable inside said cylindrical tubular body, wherein the viscoelastic food dough is entirely contained between said piston head and said bottom;
d) extruding said viscoelastic food dough by progressively advancing said rod and said piston head, coupled with said rod and pushed by it, inside the aforementioned cylindrical tubular body, towards said bottom of the cylindrical tubular body, along a sliding path, resulting in the supply, at a preset speed, of a continuous string of dough from said at least one nozzle;
e) interrupting the extrusion of said viscoelastic food dough by stopping the progress of said rod at a specific position along the aforementioned sliding path and by immediate movement of said rod towards said second end, in order to decouple said rod from said piston head and let said piston head be pushed by said viscoelastic dough towards said second end of the cylindrical tubular body.

In particular, at the moment of interruption of the advancing movement of the rod towards said at least one nozzle, the retraction of the rod towards the second end of the cylindrical tubular body results in immediate separation of the rod from the piston head. In this way, the piston head is free to slide inside the cylindrical tubular body. Thus, in an entirely advantageous manner, the viscoelastic food material still present in the cylindrical tubular body can discharge the elastic energy, accumulated in the supply step during compression between the side wall of the cylindrical tubular body and the piston head, exerting on the latter a force rapidly decreasing until the ambient pressure is reached. As a result of this force, the piston head is imparted a movement in a direction opposite to the said at least nozzle (opposite to the extrusion direction), allowing the expansion of the viscoelastic dough towards the second end of the cylindrical tubular body, instead of towards the first end thereof, i.e. in the direction of the at least one nozzle.

In fact, by means of the process according to the present invention, the supply of a string of residual dough, following the retraction movement of the rod and separation from the piston head inside the cylindrical tubular body, is prevented.

In fact, the surface of the piston head in contact with the viscoelastic material dough is far greater than the cross-sectional area of the at least one dispensing nozzle, and therefore the pressurised viscoelastic dough present inside the cylindrical tubular body (at the moment of separation of the rod from the piston head) is able to release the elastic energy accumulated by expanding in the opposite direction to the nozzle and pressing against the piston head which is free to slide. In this way, a minimum rapid movement of the piston head in the direction opposite to the nozzle (towards the second end of the cylindrical tubular body) imparted by the dough under pressure is sufficient to depressurize immediately and adequately the section of the cylindrical tubular body situated between the piston head and said bottom, interrupting the supply of the continuous string at the moment of separation of the rod from the piston head.

Indeed, according to the present invention the expression "freely slidable inside said cylindrical tubular body" means that the piston head is able to slide in a passive manner inside said cylindrical tubular body. For example, the piston head can slide when it is pushed by the rod towards the first end of the cylindrical tubular body or when it is pushed back towards the second end by the viscoelastic dough.

Accordingly, the piston head is made and molded in order to perfectly fit inside the cylindrical tubular body and be in contact with the side wall of the same. For example, in a conventional manner, the piston head can have a diameter which is substantially the same of the diameter of the inner part of the cylindrical tubular body, so that the movement of the piston head along its sliding path inside the cylindrical tubular body causes a specific and proper friction between the piston head and the side wall of the cylindrical tubular body.

Preferably, said step c) of providing said piston inside the side wall of said cylindrical tubular body is carried out by inserting the piston inside the cylindrical tubular body through the second end of the latter.

Preferably, during the aforementioned step e) of interrupting the extrusion of said viscoelastic food dough, the rod is retracted towards said second end by a preset distance.

In fact, although a minimum retraction of the piston rod allows the piston head to be pushed towards the second end of the cylindrical tubular body, wherein the movement of the piston head causes supplying of the string of dough to be interrupted, it can be convenient to impart to the rod a retraction by a preset distance, so as to allow sliding of the piston head (pushed by the dough under pressure towards said second end) by a given distance inside the cylindrical tubular body.

Preferably, the aforementioned step e) of interrupting the extrusion of said viscoelastic food dough can be followed by an additional step of starting again the extrusion of said viscoelastic food dough, bringing said rod back into the aforementioned specific position along the sliding path, this way restarting the supply of a continuous string of dough from said at least one nozzle.

In accordance with this latter embodiment, in an advantageous manner, following interruption of extrusion of the viscoelastic food dough, it is possible, as required, to resume the extrusion of the viscoelastic food material in a precise and timely manner, preferably at a pre-set speed, by means of repositioning of the piston head in the same specific position, which the piston head had at the moment of interruption of extrusion during step e), with simultaneous re-compression of the viscoelastic food dough from a situation of maximum expansion to the compression conditions present at the moment of separation of the rod from the piston head, during step e) of extrusion interruption.

This kind of operation is particularly useful both in the case when the cylindrical tubular body is loaded with a quantity of viscoelastic food material greater than that required for the printing a single item (and therefore the extrusion must be interrupted once an item has been printed, so as to proceed with printing of the next item, this being a very common situation in the case of pasta printing) and in the case where it is necessary to perform a relative movement along the aforementioned Cartesian axes (X, Y and Z) of extruder and surface, for which an interruption of extrusion is required, for example for the printing of items which have particularly complex shapes.

Preferably, in accordance with a particular embodiment of the process according to the present invention, the progress of said rod inside the cylindrical tubular body towards said first end of the cylindrical tubular body, namely towards said bottom, and the movement of this rod towards said second end is controlled by means of a control system of the extruder.

In particular, this system of controlling the extruder is able to control the position, the speed and the acceleration of the rod along the sliding path of the rod inside the cylindrical tubular body, the extrusion of the viscoelastic food material from the at least one nozzle depending on these parameters, as regards the actual speed of extrusion of the string of material.

More preferably, during the aforementioned step e) of interruption of extrusion of said viscoelastic food dough, said specific position of the rod along the aforementioned sliding path corresponds to a preset position previously saved by the control system of the extruder or said specific position of the rod along said sliding path is recorded by the control system of the extruder at the time when the rod is separated from the piston head.

Advantageously, this latter embodiment allows effective automation of the process for extrusion and deposition of a string of dough according to the invention, in particular when the aforementioned additional step of restarting the extrusion of said viscoelastic food dough is carried out, during which said rod is thus brought back into a specific position, for example previously recorded by the control system of the extruder, along the sliding path.

In particular these operations of interruption and restarting of extrusion can be performed repeatedly and in a timely manner, without knowing either the chemical/physical characteristics of the viscoelastic food dough or the volume thereof (variable depending on the progression of the advancing movement of the piston head towards said first end of the cylindrical tubular body).

In accordance with a preferred embodiment of the process according to the invention, the continuous string of dough extruded in step d) undergoes a treatment of partial surface drying ("incartamento") immediately after deposition thereof.

In fact, as is known to the person skilled in the art, at the moment when the dough is dispensed from at least one nozzle, the continuous string of dough deposited can be partially dried superficially, for example by means of application of an air flow directed onto the string as soon as it has been deposited. Preferably, air is applied at a temperature of between 60° C. and 90° C., more preferably at 80° C.

Therefore the aforementioned partial surface drying ("incartamento") results in partial hardening of the surface of the string, so as to help maintain its structure, which is desirable especially in view of the subsequent deposition of further string portions onto the string portions already deposited, with the gradual formation of a three-dimensional article, for example an article consisting of thin multiple layers (resulting from the continuous deposition of a string of dough onto the same string of dough which has already been deposited).

According to a preferred embodiment, the viscoelastic food dough prepared and dispensed as described above can be a dough based on food meal, preferably a dough suitable for the production of pasta.

In a preferred manner, the process according to the present invention finds an ideal application in the production of a three-dimensional item printed by means of a 3D-printing procedure.

The implementation of the process according to the present invention is particularly advantageous for the extrusion of doughs based on food meal for the production of pasta printed by means of a 3D-printing procedure. Advantageously, in particular owing to the aforementioned step e) involving interruption of the extrusion of said viscoelastic food dough during which said piston head is free to slide inside the cylindrical tubular body (in a direction opposite to the direction of extrusion, namely in the direction towards the second end of the cylindrical tubular body), and also owing to the aforementioned additional step of re-starting extrusion, the process according to the present invention allows the printing of articles with a high degree of precision, such as pasta shapes with precise details, ensuring that feeding of the string of dough is interrupted and started again at the right moment.

In this way, by means of the process according to the present invention, above all it is possible to adjust more precisely the smallest details of the single pasta shapes, obtaining a 3D-printed three-dimensional product in accordance with the digital three-dimensional model, which is of the highest standard.

This technical problem is also solved, according to the present invention, by an extruder comprising a cylindrical tubular body, having a first end closed by a bottom having at least one nozzle and a second end, and a piston, comprising a rod and a piston head which can be removably coupled to one another, wherein said piston can be inserted through said second end inside the side wall of said cylindrical tubular body, so that said piston head is in contact with the side wall of said cylindrical tubular body and is freely slidable inside the cylindrical tubular body.

More particularly, said piston is structured so that, by means of an advancing movement of said rod from a rest position to an end-stroke position, namely towards said first end of the cylindrical tubular body, said rod and said piston head are coupled to one another; whereas, by means of an advancing movement of said rod from an end-stroke position to a rest position, namely towards said second end of the cylindrical tubular body, said rod and said piston head can be uncoupled, and the latter is freely slidable inside the cylindrical tubular body.

When the cylindrical tubular body is loaded with a viscoelastic material, such as a dough, the device according to the present invention allows the extrusion of the material (extruded as a continuous string of dough) to be interrupted substantially in synchronism with retraction of the rod, namely with the moment when the said rod is moved towards said second end of the cylindrical tubular body.

In particular, since said rod and said piston head can removably be coupled to one another, during the extrusion the rod is coupled with the piston head and exerts a pressure on the latter, which in turn pushes the viscoelastic material contained inside the cylindrical tubular body towards said first end. Instead, when the rod is retracted inside the cylindrical tubular body towards said second end, the rod and the piston head are not coupled and the latter does not move together with the rod. Once the rod has been retracted, the piston head is therefore freely slidable inside the cylindrical tubular body: as a result of the pressure exerted by the viscoelastic material, the piston head can be pushed by the latter towards said second end, allowing release of the accumulated elastic energy, thereby eliminating the pressure within the dough, so as to allow the result explained in the preceding paragraph to be achieved. Advantageously, the device according to the present invention is therefore very precise during use, thus resulting in an insignificant and negligible amount of dough being extruded following a retraction movement of the rod.

The extruder described above can comprise furthermore coupling means for removably coupling the rod with the piston head. These coupling means have the function of facilitating the transmission of the force exerted by the rod on the piston head when the rod advances towards said first end (extrusion), namely when said rod and said piston head are coupled to one another, however without hindering the separation of the rod from the piston head when the rod is retracted inside the cylindrical tubular body towards said second end (interruption of extrusion). Advantageously said coupling means can be particularly useful when the cycle of steps which define the process according to the present invention is repeated, in particular when a new step b) is carried out, i.e. the step where a viscoelastic food dough is fed again inside said cylindrical tubular body, if necessary by means of prior extraction of said piston head from the cylindrical tubular body.

Preferably, the aforementioned coupling means for removably coupling the rod with the piston head are engaging means, magnetic coupling means or electromagnetic coupling means.

More precisely, said coupling means for removably coupling the rod with the piston head are engaging means, which allow respectively the coupling of the rod and the piston head (engagement) or uncoupling of the two components in question (disengagement), where necessary following a command of a control system of the extruder.

Similarly, as will be illustrated more clearly with reference to the detailed description and the drawings, these coupling means for coupling the rod with the piston head can be electromagnetic coupling means, which can for example be an electromagnet positioned inside said rod or a magnetic plate positioned inside said piston head, said electromagnet being able to generate a magnetic field acting on said piston head.

Basically, when the magnetic plate positioned in the piston head enters into the magnetic field generated by the electromagnet positioned inside the rod, said piston head starts a recall movement towards said rod, sliding in fact inside the cylinder towards said second end, until it substantially contacts the rod and is coupled with it.

More preferably, said means for engaging the rod with the piston head can be means for performing rotational engagement, for example by means of a mechanism which is able to couple said rod and said piston head to one another when said rod is rotated in a clockwise direction and uncouple said rod and said piston head when the rod is rotated in anti-clockwise direction.

Preferably, this piston head can comprise a venting valve suitable to put in fluid communication between the space of the cylindrical tubular body comprised between the piston head and said bottom and the space of the cylindrical tubular body comprised between said piston head and said second end, said venting valve working in open mode and closed mode. In particular said valve operates in closed mode when there is an advancing movement of said rod, coupled with the said piston head, from a rest position into an end-stroke position and the piston head is in contact with the viscoelastic food material which can be present inside the space comprised between said piston head and said bottom of the cylindrical tubular body or when said rod, not coupled with said piston head, is moved towards the second end of the cylindrical tubular body and the piston head, as a result of the pressure of the material which can be contained in the space comprised between said piston head and said bottom of the cylindrical tubular body, undergoes a sliding movement inside the cylindrical tubular body towards said second end.

Differently, said valve is in open mode, for example, when an advancing movement of said rod, coupled with said piston head, from a rest position into an end-stroke position is carried out and the piston head is not in contact with the viscoelastic food material which can be contained in the space comprised between said piston head and said bottom of the cylindrical tubular body.

Advantageously, in the case where the device is in this latter operating condition, the movement of the piston head towards said bottom (as a result of the movement of the rod coupled with the piston head in the same direction) causes the expulsion of the air contained in the space between the piston head and said bottom of the cylindrical tubular body, in particular between the piston head and the viscoelastic food material which can be contained in the same space. The expulsion of the air allows the piston head to perform a sliding movement towards said bottom until it comes into with said viscoelastic food material, thereby preventing, as a result of compression of the air contained in the space between said piston head and said bottom of the cylindrical tubular body, the food material from being expelled from the nozzle in an uncontrolled manner and/or air bubbles being trapped in said material.

At the same time, said valve is in the open mode, for example, when an advancing movement of said piston head towards said second end is induced, as a result of coupling of the piston head with the rod by means of the aforementioned coupling means.

Advantageously, in the case where the device is in this latter operating condition, the movement of the piston head towards said second end (as a result of the movement of the rod coupled with the piston head in the same direction in contact therewith and/or as a result of the magnetic field generated by a magnet which can be inserted in the rod) causes air to enter inside the space between said piston head and the bottom of the cylindrical tubular body. This incoming air allows the piston head to perform a sliding movement towards said second end, thereby preventing the piston head plus cylindrical tubular body system from acting as a pump, causing the undesirable introduction of air from the nozzle into the space comprised between the piston head and said bottom or the drawing of the already extruded food material, which is still in contact with or in the vicinity of the nozzle.

Consequently, this technical problem is also solved by a printer for the production of an item printed by means of a 3D-printing procedure, preferably for the production of pasta, comprising an extruder such as that described.

Preferably, the aforementioned printer according to the present invention can comprise a control system able to control the advancing movement of said rod inside said cylindrical tubular body towards said first end of the cylindrical tubular body, i.e. towards said bottom, and also control the movement of said rod towards said second end.

As explained above in connection with the process according to the present invention, said control system of the extruder is able to control the parameters relating to the movement of the rod, on which the extrusion of the viscous food material from the at least one nozzle depends.

More preferably, the aforementioned printer according to the present invention can further comprise at least one load cell for measuring the force applied to said piston head of the extruder, said load cell being connected to said control system.

Even more preferably, said load cell is commonly connected to the rod and measures the force imparted by this mechanical component. Advantageously, said load cell can be useful for setting up and monitoring correct operation of the device.

Further characteristic features and advantages of the present invention will emerge from the description, provided hereinbelow, of a mode of implementation of the process according to the present invention, provided by way of a non-limiting example with reference to the accompanying drawings.

DETAILED DESCRIPTION OF A PREFERRED EMBODIMENT

Figure 1:
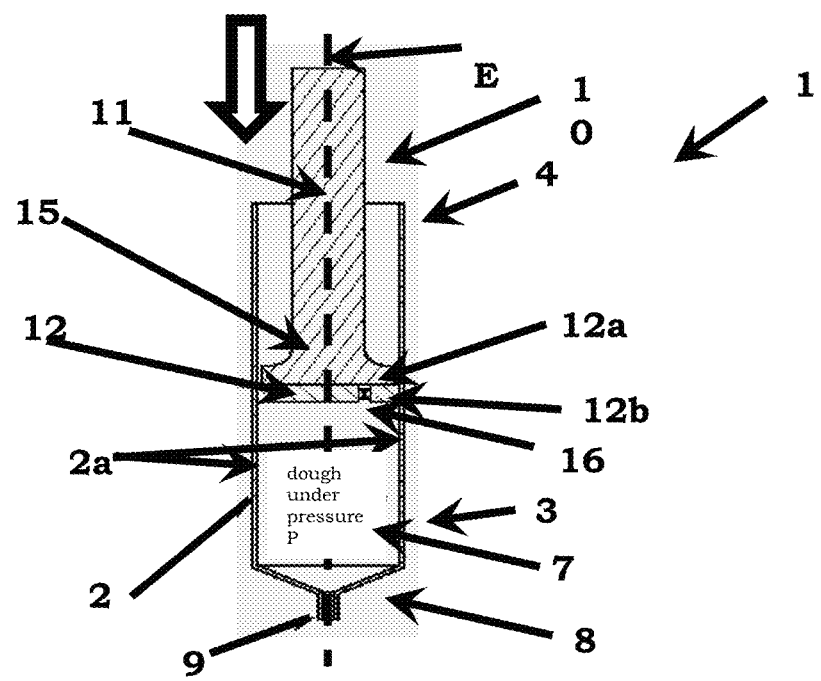
FIG. 1 relates to a step of the process according to the present invention wherein the piston is made to move towards said first end.

FIG. 1 shows an extruder 1 according to the present invention, in a simplified form thereof, comprising:
- a cylindrical tubular body 2, having a first end 3 closed by a bottom 8 (identifiable by means of the tapered end section of the cylindrical tubular body 2 shown) with at least one nozzle 9, and a second end 4;
- a piston 10 inserted inside the side wall 2a of the cylindrical tubular body 2, through the second end 4, the piston 10 comprising a rod 11 and a piston head 12 (including venting valve 16) which can be removably coupled to one another, the piston head 12 being in contact with the side wall 2a of the cylindrical tubular body 2.

The piston 10 is designed in such a way that the advancing movement of the rod 11 towards the first end 3 results in the piston head 12 also being pushed towards said first end 3, coupled with said first end 3, whereas the movement of the rod 11 towards the second end 4 does not cause the movement the piston head 12, since the rod 11 and the piston head 12 are not coupled to one another.

The nozzle 9 puts the space between the piston head 12 and the bottom 8 (storage reservoir 7) in fluid communication with the external environment.

In particular, the piston head 12 has an upper surface 12a and a lower surface 12b with venting valve 16 extending from upper surface 12a to lower surface 12b. The piston head 12 is designed to slide with a good sealing action along the side wall 2a of the cylindrical tubular body 2, substantially preventing any dough contained inside the storage reservoir 7 from spilling along the sliding surfaces, i.e. the side wall 2a of the cylindrical tubular body; for this purpose the piston head 12 can, if necessary, be provided with piston rings made of a suitable material (not shown since entirely conventional).

The piston head 12 is freely slidable inside the cylindrical tubular body 2; more precisely there is no physical constraint between the piston head 12 and the cylindrical tubular body 2; the piston head 12 can move easily in a passive manner as a result of the pressure applied on it by the overlying rod 11 and/or by the material contained in the underlying storage reservoir 7 of the cylindrical tubular body 2.

Still with reference to FIG. 1 and in a non-limiting manner, the rod 11 has a cylindrical shape which widens out slightly towards one end 15 of the said rod, designed to distribute the force of the contact with the piston head 12 situated coupled underneath it, or towards an element mounted integrally at the top of said rod, suitable for this purpose (not shown since entirely conventional).

At the same time, FIG. 1 illustrates the step d) of extrusion of a viscoelastic food dough according to the process of the present invention described above in the summary.

In particular, once a viscoelastic food dough has been introduced inside the cylindrical tubular body 2 and once said piston 10 has been inserted inside the side wall 2a of the cylindrical tubular body 2 through the second end 4, so that the piston head 12 is in contact with the side wall 2a and the food dough is entirely contained between the piston head 12 and the bottom 8, an extrusion step is performed by means of a gradual advancing movement of the piston 10 inside the cylindrical tubular body 2, i.e. of the rod 11 coupled with the piston head 12, along a sliding path, which can be superimposed on an axis E in turn longitudinal with respect to the length of the cylindrical tubular body 2. During this step, the piston 10 is pushed (by an electric motor not shown since entirely conventional) from a rest position towards an end-stroke position, namely from the second end 4 of the cylindrical tubular body towards the first end 3.

The downwards movement of the piston 2, indicated by an arrow, causes gradual sliding of the piston head 12 (during this step in contact with the rod 11), which compresses, at a pressure P, the underlying viscoelastic dough towards the inner wall 2a of the cylindrical tubular body 2 and toward the bottom 8, causing the supply of a continuous strand of dough. From FIG. 1 it is clear how, during the step in question, the end 15 of the rod 11 presses against the upper surface 12a of the underlying piston head 12, even though the rod 11 and the piston head 12 are two mechanical elements which are separate from each other.

Figure 2:
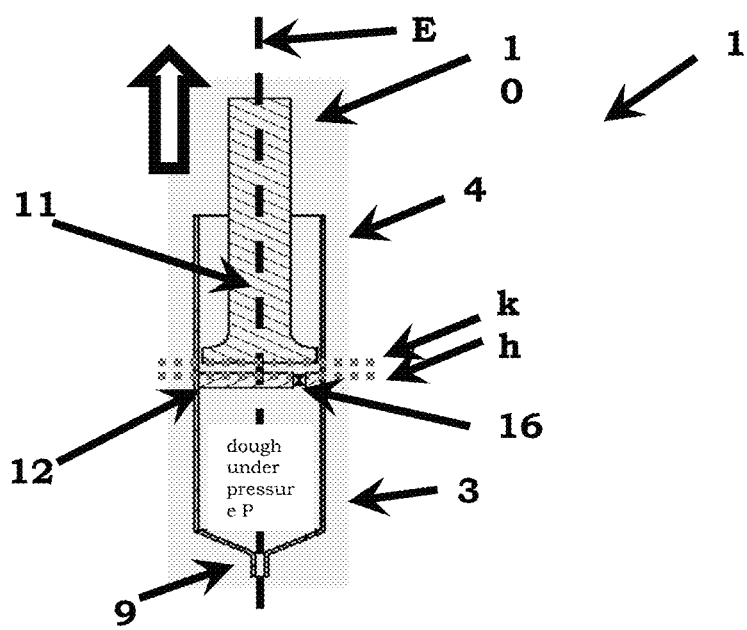
FIG. 2 relates to a step of the process according to the present invention wherein the movement of the piston towards said first end is interrupted and the rod is retracted.
Figure 3:
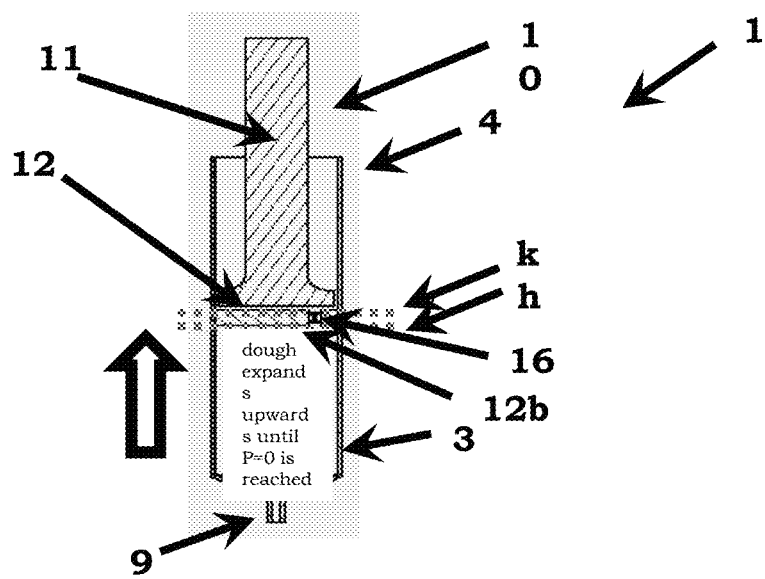
FIG. 3 shows the movement of the piston head towards said second end, as a result of the pressure exerted by the residual dough present in the cylindrical tubular body.

FIGS. 2 and 3 show the following step e) of the process according to the present invention during which the extrusion of the viscoelastic food dough is interrupted.

In particular, FIG. 2 shows the step of interruption of extrusion of said viscoelastic food dough, coinciding with stopping of the advancing movement of the rod 11, in a first specific position (identified by the letter "h" in FIG. 2) along its sliding path, and the immediate retraction of the rod 11 towards the second end 4 of the cylindrical tubular body 2, until a second specific position (identified by the letter "k" in FIG. 2) is reached along its sliding path, causing in fact the separation of the rod 11 from the underlying piston head 12 (including venting valve 16). The direction of the rod 11 during the retraction movement is indicated in FIG. 2 by means of an arrow directed upwards.

As a result of the separation operation, the rod 11 and the piston head 12 are no longer coupled to one another; the piston head 12 is therefore free to slide inside the cylindrical tubular body 2.

The dough contained inside the storage reservoir 7, which is still under pressure, is able to expand freely upwards, pressing against the lower surface 12b of the piston head 12 which, since it is no longer constrained by the rod 11, is pushed towards the second end 4, sliding from the position "h" to the position "k". The movement of the piston head 12 (including venting valve 16) is indicated in FIG. 3 by means of an arrow.

Since it is able to expand freely towards the second end 4, the residual dough of viscoelastic material is not expelled from the nozzle 9, when the extrusion of said viscoelastic food dough is interrupted by retracting of the rod 11.

Figure 4:
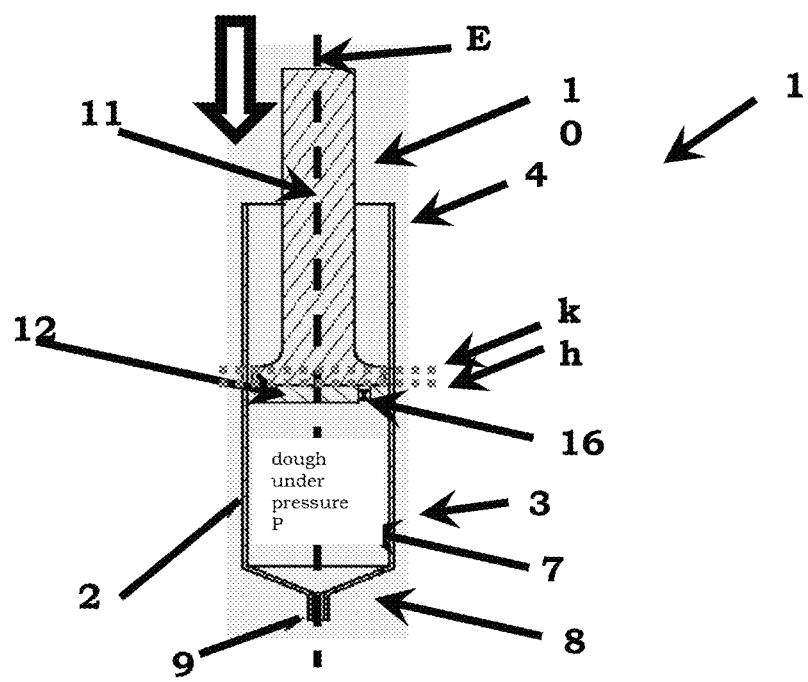
FIG. 4 shows an additional step for starting extrusion again wherein the piston is advanced towards said first end.

FIG. 4 shows a following further step where extrusion of the dough is started again, wherein the rod 11, and therefore the piston head 12 (including venting valve 16), is moved back from the position "k" to the position "h" which was previously recorded during the prior stopping operation. As can be seen, the rod 11, coupled with the piston head 12, starts to move again towards the first end 3, along the sliding path, which can be superimposed on the axis E (movement indicated by an arrow directed downwards). At the same time compression of the dough to the previous pressure P is performed and the required extrusion of the string of dough is started again.

Figure 5:
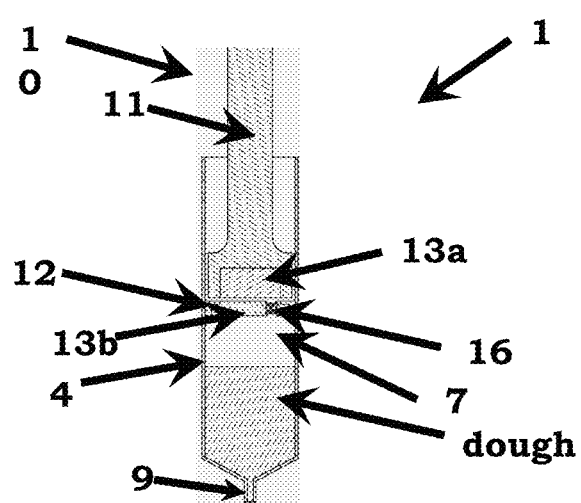
FIG. 5 shows an embodiment of the extruder according to the present invention wherein an electromagnet is positioned in the rod and a magnetic plate is positioned in the piston head.

FIG. 5 shows a particular embodiment of the extruder 1 according to the present invention comprising coupling means for removably coupling the rod 11 with the piston head 12, more specifically the rod and the piston head 12 (including venting valve 16) are removably coupled to one another by means of magnetic coupling means.

In particular, these magnetic coupling means comprise an electromagnet 13a, which is positioned inside the rod 11, and a magnetic plate 13b, which is positioned inside the piston head 12.

The invention claimed is:

1. A process for the production of a three-dimensional item by extrusion and deposition of a string of dough, comprising the following steps:
  a) providing an extruder comprising a cylindrical tubular body having a first end closed by a bottom having a nozzle and a second end, and a piston comprising a rod and a piston head that can be removably coupled to one another;
  b) feeding a viscoelastic food dough into said cylindrical tubular body;
  c) providing said piston inside the side wall of said cylindrical tubular body, said piston head being in contact with said side wall of said cylindrical tubular body and being sized to be freely slidable inside said cylindrical tubular body, said viscoelastic food dough being entirely contained between said freely slidable piston head and said bottom, and said freely slidable piston head being in contact with the viscoelastic food material present inside the space comprised between said freely slidable piston head and said bottom of the cylindrical tubular body;
  d) extruding said viscoelastic food dough by progressively advancing said rod and said freely slidable piston head, said freely slidable piston head being coupled with said rod and pushed by said rod thereby contacting and pushing said viscoelastic food dough inside said cylindrical tubular body towards said bottom of the cylindrical tubular body along a sliding path, resulting in the supply at a preset speed of a continuous string of dough from said nozzle;
  e) interrupting the extrusion of said viscoelastic food dough by stopping the progress of said rod at a specific position along said sliding path and by immediately retracting said rod towards said second end decouple said rod from said freely slidable piston head whereby said freely slidable piston head is pushed by said viscoelastic dough towards said second end of the cylindrical tubular body;
  wherein the progress of said rod inside said cylindrical tubular body towards said bottom and the movement of said rod towards said second end are controlled by means of a control system of the extruder;
  wherein, during said step e) of interrupting extrusion of said viscoelastic food dough, said specific position of said rod along said sliding path corresponds to a preset position previously saved by said control system of the extruder or said specific position of said rod along said sliding path is recorded by said control system of the extruder at the time when said rod is separated from said piston head; I
  wherein after said step e) the process further comprises an additional step of starting again the extrusion of said viscoelastic food dough, bringing said rod back into said specific position along said sliding path, thus restarting the supply of a continuous string of dough from said nozzle; and
  wherein the piston head further comprises a venting valve in fluid communication with the space of the cylindrical tubular body disposed between the piston head and said bottom and with the space of the cylindrical tubular body disposed between said piston head and said second end, said venting valve being convertible between an open mode and a closed mode, and while during said additional step of starting again the extrusion after said step e), said venting valve is in said open mode when said rod, coupled with said piston head, advances from a rest position towards an end-stroke position and the piston head is not in contact with the viscoelastic food material contained in the space between the piston head and the bottom of the cylindrical tubular body, and said venting valve is in said closed mode when said rod, coupled with the said piston head, advances from a rest position towards an end-stroke position and the piston head is in contact with the viscoelastic food material present inside the space between the piston head and the bottom of the cylindrical tubular body.

2. The process according to claim 1, wherein, during said step e) of interrupting the extrusion of said viscoelastic food dough, said rod is retracted towards said second end by a preset distance.

3. The process according to claim 1, wherein said continuous string of dough, extruded during step d), undergoes a treatment of partial surface drying after deposition thereof.

4. The process according to claim 3, wherein said partial surface drying is carried out by application of a flow of air.

5. The process according to claim 4, wherein said flow of air is at a temperature of between 60° C. and 90° C.

6. The process according to claim 5, wherein said flow of air is at 80° C.

7. The process according to claim 1, wherein said viscoelastic food dough is a dough based on food meal.

8. The process according to claim 7, wherein said dough based on food meal is suitable for the production of pasta.

9. A process for the production of a three-dimensional item printed by a 3D-printing procedure, said process comprising:

a) providing a 3D printer including an extruder comprising a cylindrical tubular body having a first end closed by a bottom having a nozzle and a second end, and a piston comprising a rod and a piston head that can be removably coupled to one another;

b) feeding a viscoelastic food dough into said cylindrical tubular body;

c) providing said piston inside the side wall of said cylindrical tubular body, said piston head being in contact with said side wall of said cylindrical tubular body and being sized to be freely slidable inside said cylindrical tubular body, said viscoelastic food dough being entirely contained between said freely slidable piston head and said bottom, and said freely slidable piston head being in contact with the viscoelastic food material present inside the space comprised between said freely slidable piston head and said bottom of the cylindrical tubular body;

d) extruding said viscoelastic food dough by progressively advancing said rod and said freely slidable piston head, said freely slidable piston head being coupled with said rod and pushed by said rod thereby contacting and pushing said viscoelastic food dough inside said cylindrical tubular body towards said bottom of the cylindrical tubular body along a sliding path, resulting in the supply at a preset speed of a continuous string of dough from said nozzle;

e) interrupting the extrusion of said viscoelastic food dough by stopping the progress of said rod at a specific position along said sliding path and by immediately retracting said rod towards said second end to decouple said rod from said freely slidable piston head whereby said freely slidable piston head is pushed by said viscoelastic dough towards said second end of the cylindrical tubular body;

wherein the progress of said rod inside said cylindrical tubular body towards said bottom and the movement of said rod towards said second end are controlled by means of a control system of the extruder; and wherein, during said step e) of interrupting extrusion of said viscoelastic food dough, said specific position of said rod along said sliding path corresponds to a preset position previously saved by said control system of the extruder or said specific position of said rod along said sliding path is recorded by said control system of the extruder at the time when said rod is separated from said freely slidable piston head;

wherein after said step e) the process further comprises an additional step of starting again the extrusion of said viscoelastic food dough, bringing said rod back into said specific position along said sliding path, thus restarting the supply of a continuous string of dough from said nozzle; and wherein the piston head further comprises a venting valve in fluid communication with the space of the cylindrical tubular body disposed between the piston head and said bottom and with the space of the cylindrical tubular body disposed between said piston head and said second end, said venting valve being convertible between an open mode and a closed mode, and while during said additional step of starting again the extrusion after said step e), said venting valve is in said open mode when said rod, coupled with said piston head, advances from a rest position towards an end-stroke position and the piston head is not in contact with the viscoelastic food material contained in the space between the piston head and the bottom of the cylindrical tubular body, and said venting valve is in said closed mode when said rod, coupled with the said piston head, advances from a rest position towards an end-stroke position and the piston head is in contact with the viscoelastic food material present inside the space between the piston head and the bottom of the cylindrical tubular body.

10. The process according to claim 9, wherein the three-dimensional item printed is a pasta.

* * * * *